United States Patent [19]

Nicholson et al.

[11] 4,013,720
[45] Mar. 22, 1977

[54] AMINE CONDENSATE

[75] Inventors: Eric Samuel Nicholson; Brian Thomas Ashworth, both of Manchester, England

[73] Assignee: Imperial Chemical Industries Limited, London, England

[22] Filed: Jan. 20, 1976

[21] Appl. No.: 650,756

[30] Foreign Application Priority Data

Feb. 10, 1975 United Kingdom ............... 5564/75

[52] U.S. Cl. .................... 260/570.5 CA; 252/401; 260/45.9 R; 260/347.8; 260/576; 260/809
[51] Int. Cl.² .......................................... C07C 87/54
[58] Field of Search ......................... 260/570.5 CA

[56] References Cited

OTHER PUBLICATIONS

Nicksie et al., "Analytical Chemistry," vol. 30, No. 12, pp. 2002–2004, (1958).

*Primary Examiner*—Robert V. Hines
*Attorney, Agent, or Firm*—Cushman, Darby & Cushman

[57] ABSTRACT

Amine condensates of the formula:

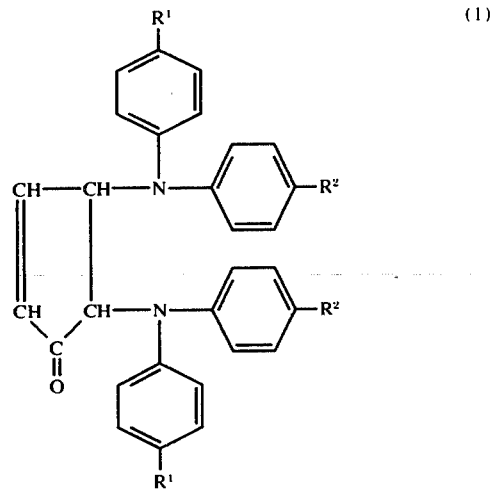

where $R^1$ and $R^2$ are the same or different and are hydrogen, alkyl, alkoxy or dialkylamino.

The amine condensates are produced by the reaction of diphenylamines and furfuraldehyde and are useful as antioxidants especially for rubbers.

3 Claims, No Drawings

AMINE CONDENSATE

This invention relates to amine condensates useful as antioxidants and in particular to the reaction products of diphenylamine or substituted diphenylamines and furfuraldehyde.

According to the invention there are provided amine condensates which are the reaction product of 2 moles of diphenylamine or certain substituted diphenylamine with 1 mole of furfuraldehyde.

The substituted diphenylamines for use in this process are of the formula:

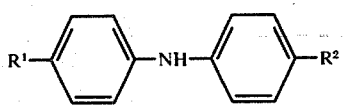

where $R^1$ and $R^2$ are the same or different and are hydrogen, alkyl, alkoxy or dialkylamino.

These amine condensates are believed to be 4,5-bis-(diphenylamino)-cyclopent-2-enones, i.e. they have the formula:

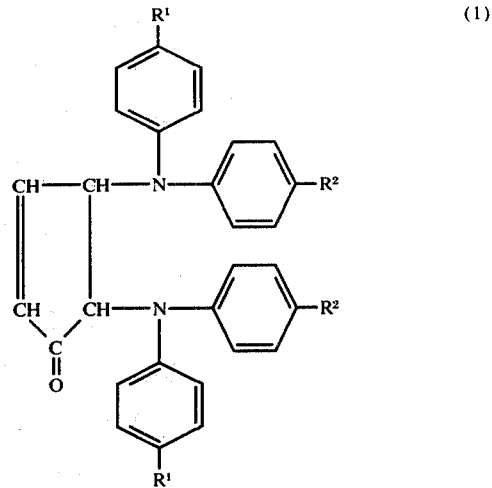

(1)

where $R^1$ and $R^2$ are the same or different and are hydrogen, alkyl, alkoxy or dialkylamino.

As examples of alkyl groups which $R^1$ and $R^2$ may represent there may be mentioned methyl, ethyl, n-propyl, isopropyl, n-butyl, sec-butyl, iso-butyl, tert-butyl, hexyl, 2-ethylhexyl, dodecyl. Preferred alkyl groups are $C_{1-12}$ particular $C_{1-4}$.

As examples of alkoxy groups which $R^1$ and $R^2$ may represent there may be mentioned methoxy, ethoxy, n-propoxy, iso-propoxy, n-butoxy, sec-butoxy, isobutoxy, tert-butoxy. Preferred alkoxy groups are $C_{1-4}$.

As examples of dialkylamino groups which $R^1$ and $R^2$ may represent there may be mentioned dimethylamino, diethylamino, di-n-propylamino, di-isopropylamino, di-n-butylamino, di-sec-butylamino, di-isobutylamino, di-tert-butylamino. Preferred dialkylamino groups are di-$C_{1-4}$-alkylamino.

As preferred compounds of formula (1) there may be mentioned 4,5-bis-(diphenylamino)cyclopent-2-enone; 4,5-bis-(4'-isopropoxydiphenylamino)cyclopent-2-enone and 4,5-bis-(4'-[N,N-diethylamino]-diphenylamino)-cyclopent-2-enone.

The reaction of 2 moles of diphenylamine or certain substituted diphenylamines and 1 mole of furfuraldehyde can be carried out, for example, by mixing the reactants and leaving in contact at room temperature, for example, for several weeks.

The reaction may also be carried out in shorter periods by heating the mixed reactants for example at temperatures of from 30° to 130° C.

The reactants can be employed in the molar ratio of diphenylamine to furfuraldehyde of substantially 2:1 but variations are possible e.g. ratios from 2.5:1 to 0.2 to 1 may be used. It is convenient in the absence of solvent to use a ratio of 1.5:1 or richer in furfuraldehyde as this gives a fluid solution of the reactants, which on standing deposits crystals of the product substantially free from diphenylamine or substituted diphenylamine reactant.

The reaction is normally conducted in the absence of solvent but in some circumstances it may be convenient to dissolve or suspend the reactants in solvents such as ethanol, acetone, N,N-dimethyl formamide, nitrobenzene, pyridine, N-methylformamide.

The speed of the reaction is increased by the addition of catalysts for example, sodium acetate, sodium dihydrogen phosphate, barium hydroxide.

The product may be isolated and purified by any conventional technique such as filtration, crystallisation, extraction, evaporation or distillation.

The invention also provides compositions stabilised against oxidation which comprise an organic material susceptible to oxidation and, in antioxidant amount, the amine condensate described above.

The organic material may be a fat or oil, but is more suitably a polymer such as a polyolefin, e.g. polyethylene, polypropylene, poly(4-methylpentene-1) or copolymers thereof with minor amendments of other ethylenically unsaturated compounds such as pentent-1 and decene-1, other polymers of ethylenically unsaturated compounds such as methylmethacrylate, vinyl chloride, acrylonitrile, vinylidene chloride and vinyl acetate, or especially natural rubber or a synthetic rubber such as a polymer of butadiene or isoprene or a copolymer of butadiene or isoprene with styrene, acrylonitrile, methyl methacrylate or other polymerisable monomer, or of butylene with a conjugated diene or of ethylene, propylene and a diolefin.

The amine condensate may be incorporated into the organic material in any conventional manner. It may for example be mixed with solid polymer in chip or finely divided form, blended with the polymer, e.g. unvulcanised rubber, on a mill, or added to the polymer in solution in a solvent which is subsequently evaporated.

In the case of rubbers the amine condensate is conveniently blended with the rubber in unvulcanised form together with other compounding ingredients such as accelerators, vulcanising agents, fillers and pigments and the unvulcanised rubber composition vulcanised e.g. by heat to give a stabilised vulcanisate.

The amount of the amine condensate is conveniently from 0.1 to 10%, and preferably from 0.5 to 2.0%, of the weight of rubber.

Rubber vulcanisates are obtained which have both good heat-aging and antiflex cracking properties.

The process of incorporating the amine condensate into oxidation susceptible organic materials, the unvulcanised rubber composition containing stabilising amounts of the compound of the amine condensate, the process of vulcanising the unvulcanised, stabilised, rubber composition and stabilised vulcanisate are all further features of the invention.

The invention is illustrated by the following Examples in which all parts and percentages are by weight unless otherwise specified.

EXAMPLE 1

560 parts of diphenylamine are added to 208 parts furfural and the mixture left to stand at room temperature for 80 days. The large yellow crystals that form are filtered off to give 285 parts product. Recrystallisation from 80/100 petrol ether gives yellow crystals with a melting point of 144–6° C $C_{29}H_{24}N_2O$ required C=83.7%, H=5.8%, N=6.7%. Found by microanalysis C=82.6%, H=6.2%, N=6.7%. An infra-red spectrum shows a strong carbonyl absorption at 1,725 $cm^{-1}$ and a strong absorption at 1,593 $cm^{-1}$ indicative of a cyclopen-2-enone. This evidence, together with the NMR spectrum indicates the product to be 4,5-bis-(diphenylamino)-cyclopent-2-enone.

EXAMPLE 2

6.4 parts of 4-isopropoxydiphenylamine and 12 parts furfural are mixed and allowed to stand at room temperature for 145 days. The large yellow crystals that form are filtered off and recrystallised from isopropanol to give 2 parts of product with mpt. 144°–146° C. Microanalysis, infra-red spectrum and NMR spectrum are all indicative that the product is 4,5-bis-(4'-isopropoxydiphenylamino)-cyclopent-2-enone.

EXAMPLE 3

A rubber masterbatch, detailed below, is prepared by mixing the ingredients together in a BR size Banbury mixer.

|  | Parts by Weight |
|---|---|
| Natural rubber (SMR 5) | 100 |
| zinc oxide | 3.5 |
| Stearic acid | 3.0 |
| N330 (high abrasion furnace) block | 45.0 |
| Aromatic process oil | 3.5 |
| N-cyclohexyl benzthiazyl sulphenamide | 0.5 |
| Sulphur | 2.5 |

To a portion of the master batch the product of Example 1 is added at a dosage of 1.0 part per hundred parts of rubber on a laboratory mill at 70° C. Test pieces are vulcanised for 20 minutes at 153° C. The resistance to aging of the vulcanised compounds is then assessed by oven tests at 100° C, and resistance to flux cracking assessed by the Di Mattia test. The results are given in Table 1.

Table 1

| Unaged properties | Untreated | 1 phr 4,5-bis-(diphenyl-amino)cyclopent-2-enone |
|---|---|---|
| Tensile strength ($MN/m^2$) | 25.6 | 27.2 |
| Elongation at break (%) | 495 | 520 |
| Modulus at 200% elongation ($MN/m^2$) | 7.3 | 7.1 |

| Aged properties % Retained Tensile strength after ageing at 100°C for | $MN/m^2$ | % of unaged | $MN/M^2$ | % of unaged |
|---|---|---|---|---|
| 16 hours | 13.2 | 51.5 | 18.4 | 67.6 |
| 30 hours | 6.0 | 23.4 | 12.0 | 44.1 |
| 48 hours | 4.1 | 16.0 | 8.4 | 30.9 |

|  | Untreated | 1 phr 4,5-bis-(diphenylamino)cyclopent-2-enone |
|---|---|---|
| Di Mattia Flexing Characteristics No. of kilocyclo to reach stage of cracking | | |
| Stage C | 25 | 35 |
| D | 35 | 60 |
| E | 50 | 80 |
| F | 55 | 100 |

EXAMPLE 4

9.6 Parts of 4-(N,N-diethylamino)-diphenylamine and 11.92 parts of furfural are mixed and allowed to stand at room temperature for 91 days. The yellow crystals that form are then filtered off and recrystallised from isopropanol to give 2.4 parts of product m.p. 136°–138° C. The NMR spectrum indicates that the product is 4,5-bis-(4'-diethylaminodiphenylamino)-cyclopent-2-enone.

EXAMPLE 5

A rubber master batch is prepared as in Example 3.
To a portion of the master batch the product of Example 2 is added at a dosage of 1.0 part per hundred parts of rubber on a laboratory mill at 70° C. Test pieces are vulcanised and tested as in Example 3. The results are given in Table II.

TABLE II

| Unaged properties | Untreated | 1 phr 4,5-bis-(4'-isopropoxydiphenylamino)-cyclopent-2-enone |
|---|---|---|
| Tensile strength ($MN/m^2$) | 26.8 | 27.2 |
| Elongation at break (%) | 455 | 480 |
| Modulus at 200% elongation ($MN/m^2$) | 8.2 | 7.8 |
| % Retained Tensile strength | | |

TABLE II-continued

| after ageing at 100°C for | | |
|---|---|---|
| 16 hours | 73.9 | 87.5 |
| 30 hours | 57.5 | 80.9 |
| 48 hours | 28.4 | 62.5 |
| 72 hours | 16.0 | 41.2 |
| De Mattia Flexing Characteristics No. of kilocycles to reach stage of cracking | | |
| Stage B | 6 | 13 |
| C | 15 | 35 |
| D | 25 | 60 |
| E | 30 | 80 |
| F | 40 | 130 |

EXAMPLE 6

A rubber master batch is prepared as in Example 3. To a portion of the master batch the product of Example 4 is added at a dosage of 1.0 part per 100 parts of rubber on a laboratory mill at 70° C. Test pieces are vulcanised and tested as in Example 3. The results are given in Table III.

TABLE III

| Unaged properties | Untreated | 1 phr 4,5-bis-(4'-diethylaminodiphenylamino)-cyclopent-2-enone |
|---|---|---|
| Tensile strength (MN/m²) | 23.7 | 24.4 |
| Elongation at break (%) | 505 | 555 |
| Modulus at 200% elongation (MN/m²) | 6.0 | 5.4 |
| Aged properties | | |
| % Retained Tensile strength after ageing at 100°C for | | |
| 16 hours | 80.2 | 93.4 |
| 30 hours | 57.4 | 81.1 |
| 48 hours | 34.6 | 59.8 |
| De Mattia Flexing Characteristics No. of kilocycles to reach stage of cracking | | |
| Stage C | 27 | 65 |
| D | 45 | 80 |
| E | 54 | 100 |
| F | 63 | 135 |

EXAMPLE 7

6.3 Parts of 4-ethoxydiphenylamine are slurried with 6.0 parts of furfural and left standing at room temperature for 52 days, by which time no solid remained. 10 Parts of methanol are added and the mixture stood overnight in a refrigerator. The precipitated solid is filtered off the next day and recrystallised from isopropanol to give 2.2 parts product with m.p. 122°–4° C. By micro-analysis, NMR and IR spectra the product is believed to be 4,5-bis-(4'-ethoxydiphenylamino)-cyclopent-2-enone.

EXAMPLE 8

To a portion of a master batch, prepared as in Example 3, are added 1.5 parts of the product of Example 7 per hundred rubber on a laboratory mill at 70° C. Test pieces are vulcanised for 20 minutes at 153° C. Oxygen uptake tests are carried out at 90° C and the results are given in Table IV.

TABLE IV

| Oxygen uptake at 90°C | No additive | 1,5 phr 4,5-bis-(4'-ethoxydiphenylamino)-cyclopent-2-enone |
|---|---|---|
| Hours to 1% uptake | 28 | 55 |
| Hours to 2% uptake | 49 | 88 |

We claim:
1. An amine condensate of the formula:

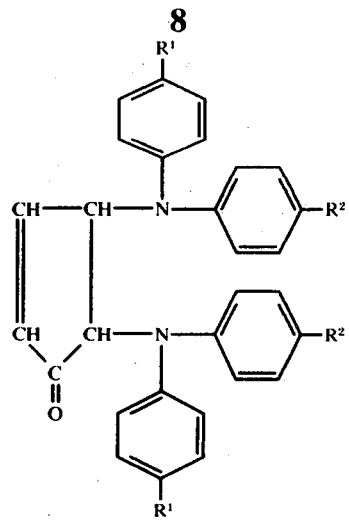
where $R^1$ and $R^2$ are the same or different and are hydrogen, alkyl, alkoxy or dialkylamino.
2. An amine condensate as claimed in claim 1 where $R^1$ and $R^2$ are $C_{1-12}$ alkyl, $C_{1-4}$ alkoxy or di($C_{1-4}$ alkyl)amino.
3. 4,5-Bis(diphenylamino)cyclopent-2-enone.
* * * * *